Jan. 22, 1935.   M. W. FISCHER   1,988,446
FLARE
Filed Aug. 9, 1932   2 Sheets—Sheet 1
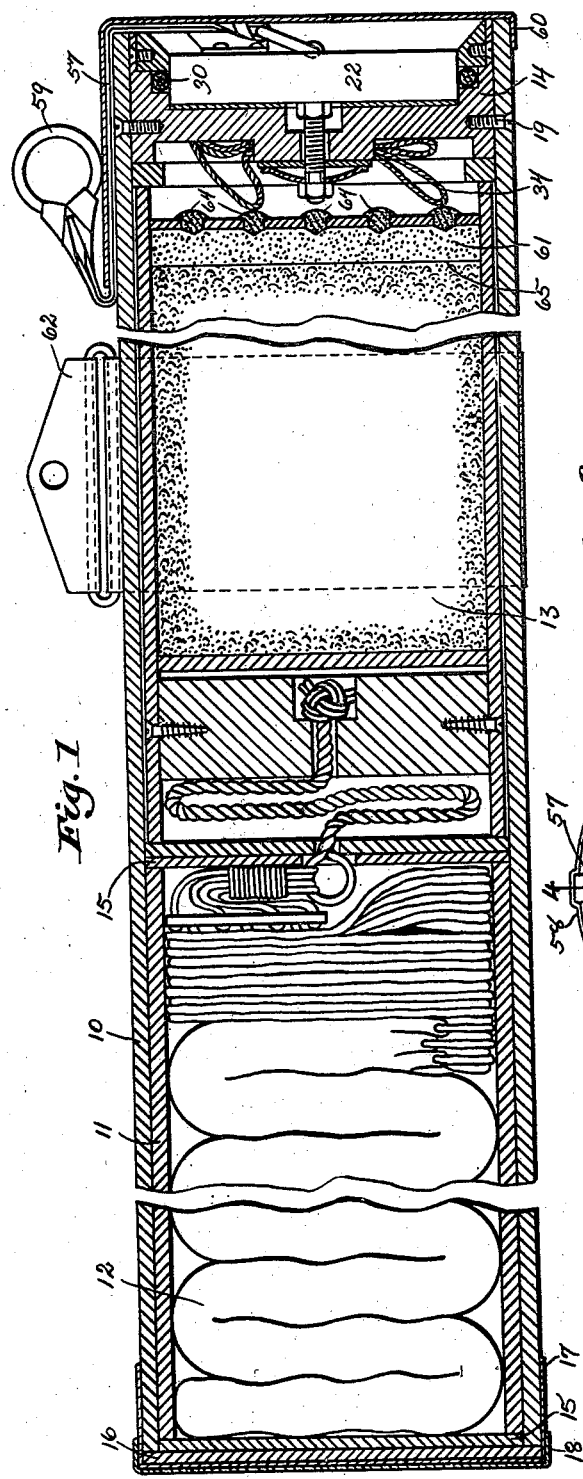
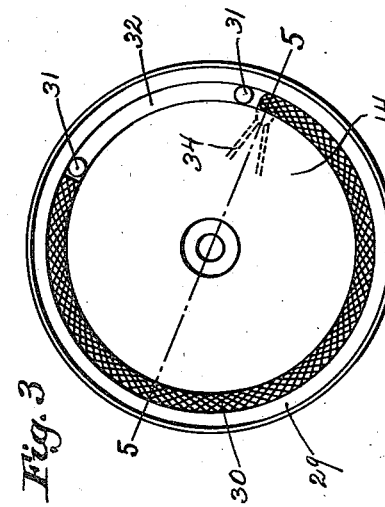
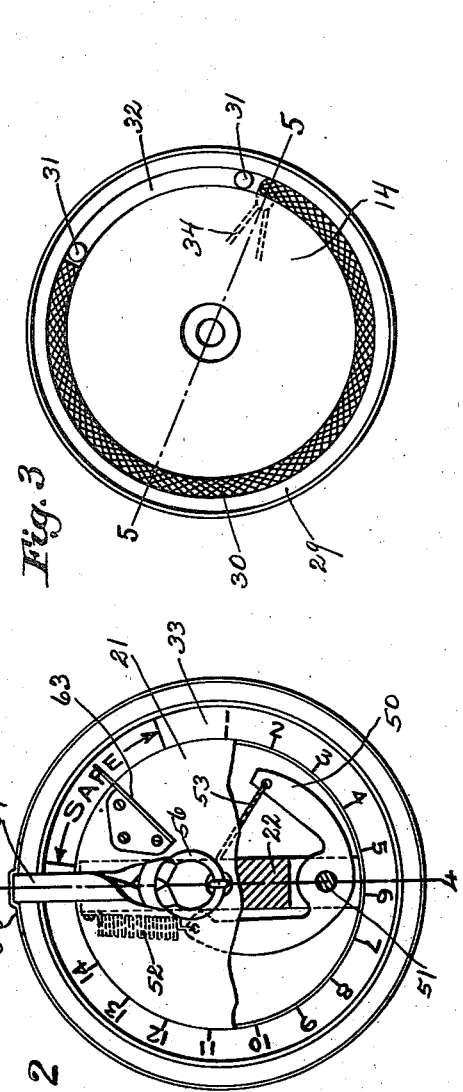
Inventor:
Max W. Fischer
by Robert A. Fowunku
Attorney Jan. 22, 1935.    M. W. FISCHER    1,988,446
FLARE
Filed Aug. 9, 1932    2 Sheets-Sheet 2
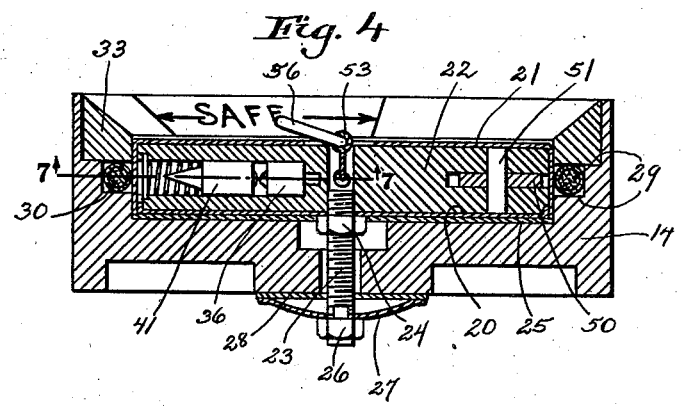
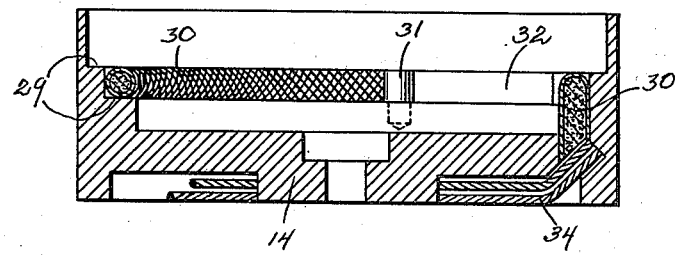
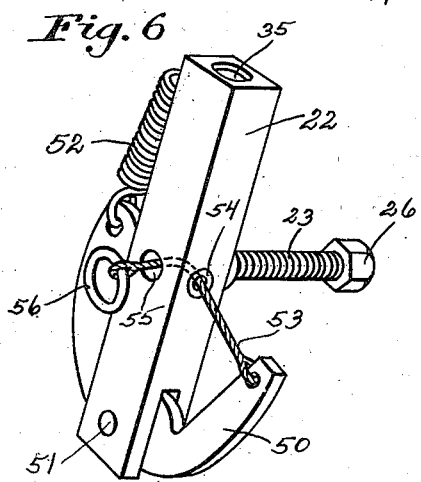
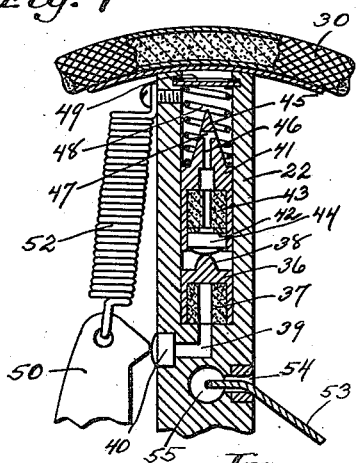
Inventor:
Max W. Fischer
by Robert A. [Attorney signature]
Attorney Patented Jan. 22, 1935

1,988,446

UNITED STATES PATENT OFFICE 1,988,446

FLARE

Max W. Fischer, Washington, D. C.

Application August 9, 1932, Serial No. 628,089

6 Claims. (Cl. 102—24)

(Granted under the act of March 3, 1883, as amended April 30, 1928; 370 O. G. 757)

This invention relates broadly to a flare, and more particularly to a flare adapted to be released in conjunction with a parachute from an aircraft in the landing of mail pouches, food stuffs, medicines, and the like, particularly in devastated areas.

The invention has for an object the provision of a time controlling mechanism carried by the flare in such a manner that when it is released from an aircraft at varying altitudes, the parachute will be brought into operation at a definite position with respect to the object at which it is directed.

Another object of the invention is the provision of a rotatable firing mechanism so arranged that it will ignite a powder time fuse at a predetermined point along its length to release a parachute at the termination of the burning of the fuse.

With the above and other objects in view, the invention consists in the construction, combination and arrangement of parts as will be described more fully hereinafter.

Reference is to be had to the accompanying drawings forming a part of this specification, in which like reference characters indicate corresponding parts throughout the several views, and in which:

Fig. 1 is a longitudinal sectional view of my invention;

Fig. 2 is an end view of the time controlling mechanism;

Fig. 3 is a view showing the position and arrangement of the powder time fuse employed in my invention;

Fig. 4 is a sectional view on line 4—4 of Fig. 2;

Fig. 5 is a sectional view on line 5—5 of Fig. 3;

Fig. 6 is a perspective view of the firing mechanism holder;

Fig. 7 is a sectional view on line 7—7 of Fig. 4.

Referring more particularly to Fig. 1 of the drawings, 10 indicates a cylindrical casing housing a parachute container 11, parachute 12, illuminant 13 and time fuse block 14. The parachute container is closed at its ends by disk 15, preferably of cardboard, fitting closely within the casing 10, and the latter is closed at the parachute end by a similar disk 16 secured in position by a cloth strip 17 glued or otherwise made fast to the casing. A metallic cap 18 protects the cloth strip against damage when the flare is in storage or being handled in transportation preparatory to being installed on a plane for launching purposes. The opposite end of the casing is closed by the time fuse block 14 secured within the casing by suitable fastening elements 19.

The time fuse block is provided with a central chamber into which is fitted a rotatable cup 20 having a cover 21 (Fig. 4), and which is adapted to receive a firing mechanism holder 22. The holder is secured in the cup by a stud 23 and lock nut 24 passing through a central bore in the time fuse block. Between the time fuse block and cup, I have placed a felt washer 25. To maintain the desired tension against the washer as well as to hold the stud 23 in position, I provide an adjusting nut 26 under which there is spring washer 27 bearing against a metal disk 28 on the exterior surface of the block 14. The wall of the chamber is provided with circumferential recesses 29. A powder time fuse 30 is coiled within one of the recesses, but it does not extend completely around the recess, there being a space between its ends, as more clearly shown in Fig. 3. It is desirable that the space thus provided be filled with a plastic composition 32. Pins 31 positioned at suitable intervals in the recess prevent the powder time fuse and plastic filler from sliding around the recess out of position for proper functioning of the flare. The purpose of the space between the ends of the powder time fuse will be explained later. A ring 33 that is calibrated in any desired manner occupies the other of the recesses, and lies directly over the powder time fuse. A portion of this ring is marked "Safe" (see Fig. 2), this portion corresponding in length and position with the space between the ends of the powder time fuse. A quick match 34 extends through suitable passageways in the time fuse block and is in contact with one end of the powder time fuse that is turned downward through the block, as may be more clearly seen in Fig. 5.

The firing mechanism holder 22 that is seated in the rotatable cup 20 is square in cross section and is provided with a central bore 35 extending partially through the longitudinal axis of the holder for housing the elements for igniting the powder time fuse, as illustrated in Fig. 7. One of these elements is a cylindrical primer 36 containing a compressed powder pellet 37, and being provided with a spherical firing end portion 38. The pellet is tubular in shape, its bore communicating with a passageway 39 extending to the exterior of the holder 22 and in the outer end of which there is a primer cap 40. The other of the elements is a cylindrical fuse igniting member 41 in the body of which and supported by a washer 42 there is a compressed powder pellet 43. A primer cap 44 is placed between the pellet 43 and the firing end 38 of the member 36. The member 41 terminates in a sharp conical end portion 45 having a central bore 46 communicating with lateral openings 47 near the apex of the cone. The primer 36 and fuse igniter 41 are held in engagement and at the inner end of the bore 35 by a spring 48 interposed between the primer and a crimped paper retaining disk 49 secured in the holder 22 in any practical manner.

In Fig. 6 is shown the mechanism for igniting the primer cap 40. This mechanism includes a bell crank lever 50 pivoted at 51 to the holder 22, and having one end hammer shaped to strike against and ignite the primer cap 40. A spring 52 having one end fastened to this end of the lever and the other end to any suitable part of the holder 22 normally holds the hammer end against the cap. To the other end of the lever a light, severable cord 53, that passes through an opening 54 in the firing mechanism holder 22 and emerges through an opening 55 at right angles thereto, is attached. A ring 56 is secured to the free end of the cord, and to the ring is fastened a rip tape 57 that passes over the end and down the side of the casing 10, and which is held in place by cloth or paper adhesive tape 58. The rip tape is secured to any suitable part of the carrying aircraft by a ring 59. The end of the flare in which is mounted the time controlling mechanism is covered and protected by a metallic cap 60 during the time the flare is not in operable position.

The illuminant 13 is divided into two sections of like composition by an inflammable disk 65, the major section being for the purpose of casting a light over a large terrain when the parachute is released, and the other section 61 being less compressed so that sufficient pressure may be built up after its ignition by the quick match 34 to sever the cloth retaining strip 17 to free the parachute at the desired time.

The flare shown in the drawings is designed for suspension from a bomb rack of an aircraft, but I do not limit myself to this particular type as one that can be released through a tube or cast from the cockpit of the aircraft will function as successfully as the one illustrated. In the use of this latter type of flare the only alterations required to be made to the flare structure are the removal of the suspension band 62 by which the flare of the present drawings is attached to the bomb rack, and lengthening of the rip tape 57 to reach into the cockpit of the aircraft.

As above stated, the powder time fuse 30 does not extend the entire distance of the recess in which it is seated, but a space filled with a plastic material is left between its ends. Also, on the graduated ring 33 there is an arc marked "Safe" which is positioned directly over the aforesaid space. The space between the ends of the fuse is left to provide a safety zone in whose range there would be no ignition of the flare illuminant should the fuse igniting mechanism be set into operation inadvertently or prematurely. Should either of these two contingencies occur, the fuse igniting member 41 would strike against the plastic filler instead of penetrating the fuse 30 thereby conveying no fire to the fuse to ignite it. A pointer 63 sweeps over the graduated ring 33 and by this means the operator is able to ascertain the position of the igniting mechanism with respect to the fuse, the pointer being carried by the rotatable cup over 21.

In preparing the flare for launching, the metallic protective cap 60 is removed from the casing, the pointer 63 is moved to the desired graduation on the ring 33, and the ring 59 secured to its holding member, whether it be on a bomb rack or other place about the aircraft.

When the flare is launched, the rip tape will be torn free of its fastening tape and will exert a pull against the tension of spring 52 on the bell crank lever 50 through the medium of the ring 56 and cord 53 until the lever arm to which the cord is attached abuts against the firing mechanism holder 22. When this occurs, the continued pull on the cord breaks it, allowing the spring 52 to return the lever to its normal position with sufficient velocity to fire the primer cap 40. This ignites the powder pellet in the primer 36 which in turn ignites the powder pellet in the fuse igniting member 41, driving the conical end portion of said member into the powder time fuse 30. Flames issuing from the lateral openings 47 ignite the fuse 30. The distance from the end of the fuse contacting with the quick match 34 that the conical end portion enters the fuse determines the time that will elapse before the illuminant is ignited. This distance is controlled by setting the pointer 63 at the desired graduation on the ring 33 which rotates the cup 20 carrying the firing mechanism holder. The portion 61 of the illuminant is ignited through the powder pellets 64 with which the quick match is in contact, as well as being in contact with the fuse 30. When sufficient pressure has developed as a result of the ignition of portion 61 of the illuminant, the cloth strip 17 will part, allowing the casing 10 to free itself from the parachute container. When the casing has thus been freed, the illuminant 13, that has been ignited by the burning of the portion 61, is supported in air by the parachute.

It will be understood that the above description and accompanying drawings comprehend only the general and preferred embodiment of my invention, and that various changes in minor details of construction, proportion and arrangement of parts may be resorted to within the scope of the appended claims without sacrificing any of the advantages of this invention.

The invention described herein may be manufactured and used by or for the Government of the United States of America for governmental purposes without the payment of any royalty thereon.

What I claim is:

1. An aircraft flare including a casing, an illuminant, a parachute, a fuse block, a fuse therein, an inflammable connection between the illuminant and fuse, a rotary cup carried by the block, and a fuse igniting means carried by the cup, said means including a fuse penetrating member provided with passageways therethrough, a powder pellet carried by said member, a primer cap carried by said member, a primer member engaging with said cap, a powder pellet carried by the primer member, a percussion cap, and means for exploding the percussion cap.

2. An aircraft flare including a casing, an illuminant therein divided into a section producing a pressure to eject the illuminant from the casing and an illuminating section, an inflammable disk separating said sections said sections being of the same composition, the latter section being ignited by the former section and disk, means for igniting the pressure producing section, and a parachute to suspend the flare in air after ignition of the illuminant.

3. An aircraft flare including a casing, a parachute therein, an illuminant also therein, a fuse block, a fuse carried thereby for igniting the illuminant, a rotary cup in the block, a fuse igniting member carried by and movable radially with respect to the cup, and means for setting said igniting member into operation.

4. An aircraft flare including a casing, an illuminant therein divided into sections of like composition, one of which is compressed to provide an illumination, means for igniting said compressed section, and a parachute carried by the casing to suspend the flare in air after ignition of the illuminant.

5. An aircraft flare including a casing, a parachute therein, an illuminant within the casing divided into sections of like composition, one of which is compressed whereby illumination is provided when ignited and the other of which is more loosely compressed whereby a pressure is produced when ignited to eject the parachute and illuminant from the casing, the former section being ignited by the latter, and means for igniting the compressed section.

6. An aircraft flare defined in claim 5 and, said means comprising a fuse block provided with a plurality of circumferential recesses, a fuse extending partially around one of the recesses, a quick match connecting the fuse and illuminant, a scale mounted in another of the recesses and superposing the fuse, a rotary cup mounted in the block, a flame carrying mechanical fuse piercing and igniting means carried by the cup, and means for setting said igniting means into operation.

MAX W. FISCHER.